United States Patent
Oowada et al.

(10) Patent No.: US 7,896,392 B2
(45) Date of Patent: Mar. 1, 2011

(54) AIRBAG DEPLOYMENT CONTROLLER AND PASSENGER PROTECTION DEVICE INCLUDING THE SAME

(75) Inventors: Tohru Oowada, Saitama (JP); Mineyuki Ooishi, Saitama (JP); Ryuichi Asada, Saitama (JP); Tetsuya Ozawa, Saitama (JP); Toshinori Yagi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 177 days.

(21) Appl. No.: 12/318,103

(22) Filed: Dec. 22, 2008

(65) Prior Publication Data

US 2009/0167005 A1   Jul. 2, 2009

(30) Foreign Application Priority Data

Dec. 26, 2007 (JP) .................... 2007-335084

(51) Int. Cl.
   *B60R 21/16* (2006.01)
(52) U.S. Cl. ......... 280/735; 180/271; 180/274; 280/734; 701/45; 340/436
(58) Field of Classification Search .......... 280/735; 701/45, 46; 340/436, 438; 180/274
See application file for complete search history.

(56) References Cited

U.S. PATENT DOCUMENTS

| | | | | |
|---|---|---|---|---|
| 6,426,567 | B2 * | 7/2002 | Ugusa et al. | 307/10.1 |
| 7,654,564 | B2 * | 2/2010 | Ide | 280/735 |
| 2002/0163170 | A1 | 11/2002 | Foo et al. | |
| 2004/0164534 | A1 * | 8/2004 | Higashiyama | 280/735 |
| 2006/0273559 | A1 | 12/2006 | Uono et al. | |
| 2007/0055429 | A1 | 3/2007 | Komaki et al. | |
| 2007/0173998 | A1 | 7/2007 | Furui | |
| 2008/0172158 | A1 * | 7/2008 | Oishi | 701/45 |
| 2008/0269991 | A1 * | 10/2008 | Yamashita | 701/45 |

FOREIGN PATENT DOCUMENTS

| | | |
|---|---|---|
| DE | 10 2004 013 268 | 9/2005 |
| JP | 08127310 A * | 5/1996 |
| JP | 9-58408 | 3/1997 |
| JP | 2001180429 A * | 7/2001 |
| JP | 2006-44432 | 2/2006 |
| JP | 2006-88824 | 4/2006 |
| JP | 2006341653 A * | 12/2006 |
| WO | 2004/043745 | 5/2004 |

OTHER PUBLICATIONS

Extended European Search Report issued Apr. 3, 2009 in the corresponding European application.

* cited by examiner

*Primary Examiner* — Toan C To
*Assistant Examiner* — James English
(74) *Attorney, Agent, or Firm* — Wenderoth, Lind & Ponack, L.L.P.

(57) ABSTRACT

An airbag deployment controller and a passenger protection device including the same are provided to prevent erroneous (false) operation of an airbag due to noises and quickly deploy the airbag. The passenger protection device determines whether or not to drive an airbag unit, upon determining a detected value of a front acceleration sensor as being over a first collision threshold. Then, when determining to drive the airbag unit, the passenger protection device determines whether or not a detected value of a central acceleration sensor exceeds a second collision threshold. With the detected value being over the second threshold, it generates a driving signal and outputs it to the airbag unit in a final deployment control process. Thereby, the airbag unit operates an inflator to drive an airbag.

2 Claims, 11 Drawing Sheets

AIRBAG DEPLOYMENT CONTROLLER AND PASSENGER PROTECTION DEVICE INCLUDING THE SAME

CROSS REFERENCE TO RELATED APPLICATION

The present application is based on and claims priority from Japanese Patent Application No. 2007-335084, filed on Dec. 26, 2007, the disclosure of which is hereby incorporated by reference in its entirety.

BACKGROUND OF THE INVENTION

1. Field of the Invention

The present invention relates to an airbag deployment controller which drives an airbag unit with use of a main sensor and a sub sensor as well as a passenger protection device including such an airbag deployment controller.

2. Description of the Related Art

In the prior art, a motor vehicle comprises a passenger protection device having an airbag. For example, Japanese Unexamined Patent Application Publication No. 2006-44432 discloses a passenger protection device which comprises an airbag deployment determining unit, an airbag drive unit, and an airbag unit to drive the airbag drive unit for an airbag deployment when the airbag deployment determining unit determines to deploy the airbag according to detected values of a front acceleration sensor and a central acceleration sensor.

Figure 10:
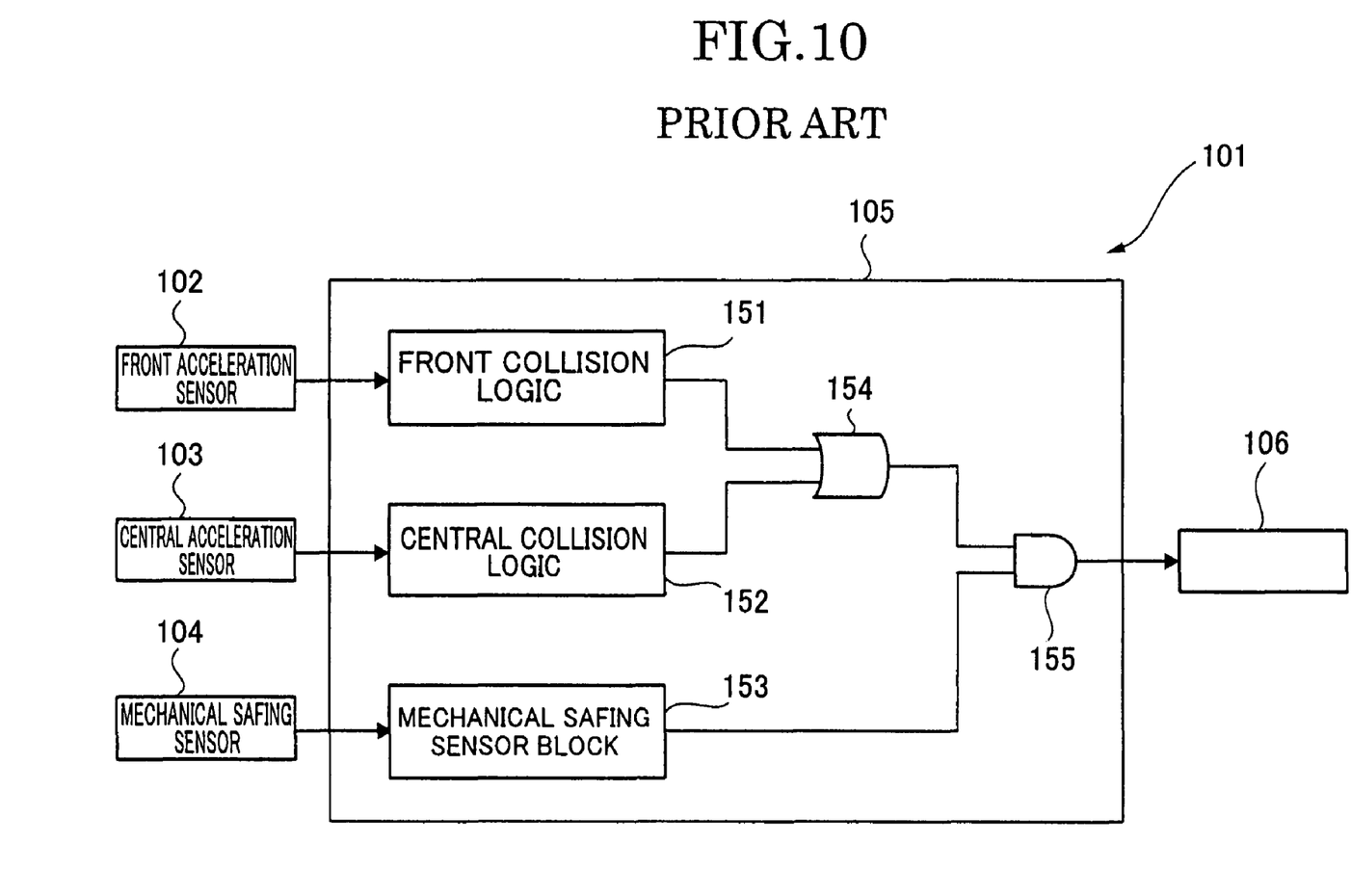
FIG. 10 is a block diagram of a prior art passenger protection device.

However, there is a drawback in the passenger protection device in that the airbag deployment determining unit may erroneously (falsely) determine to deploy the airbag when the front acceleration sensor and central acceleration sensor receive noises. For the purpose of preventing erroneous determination, a passenger protection device 101 as shown in FIG. 10 has been proposed.

The passenger protection device 101 comprises a front acceleration sensor 102, a central acceleration sensor 103, and a mechanical safing sensor 104. The front acceleration sensor 102 and the central acceleration sensor 103 constitute a main sensor while the mechanical safing sensor 104 constitutes a sub sensor.

In an airbag deployment controller 105 of the passenger protection device 101, a frontal collision logic 151 determines whether or not to deploy an airbag according to a detected value of the front acceleration sensor 102. Also, a central collision logic 152 determines whether or not to deploy an airbag according to a detected value of the central acceleration sensor 103.

In the airbag deployment controller 105, an OR circuit block 154 generates a drive signal for an airbag unit 106, upon receiving a determination to deploy the airbag from either the frontal collision logic 151 or the central collision logic 152.

Figure 11:
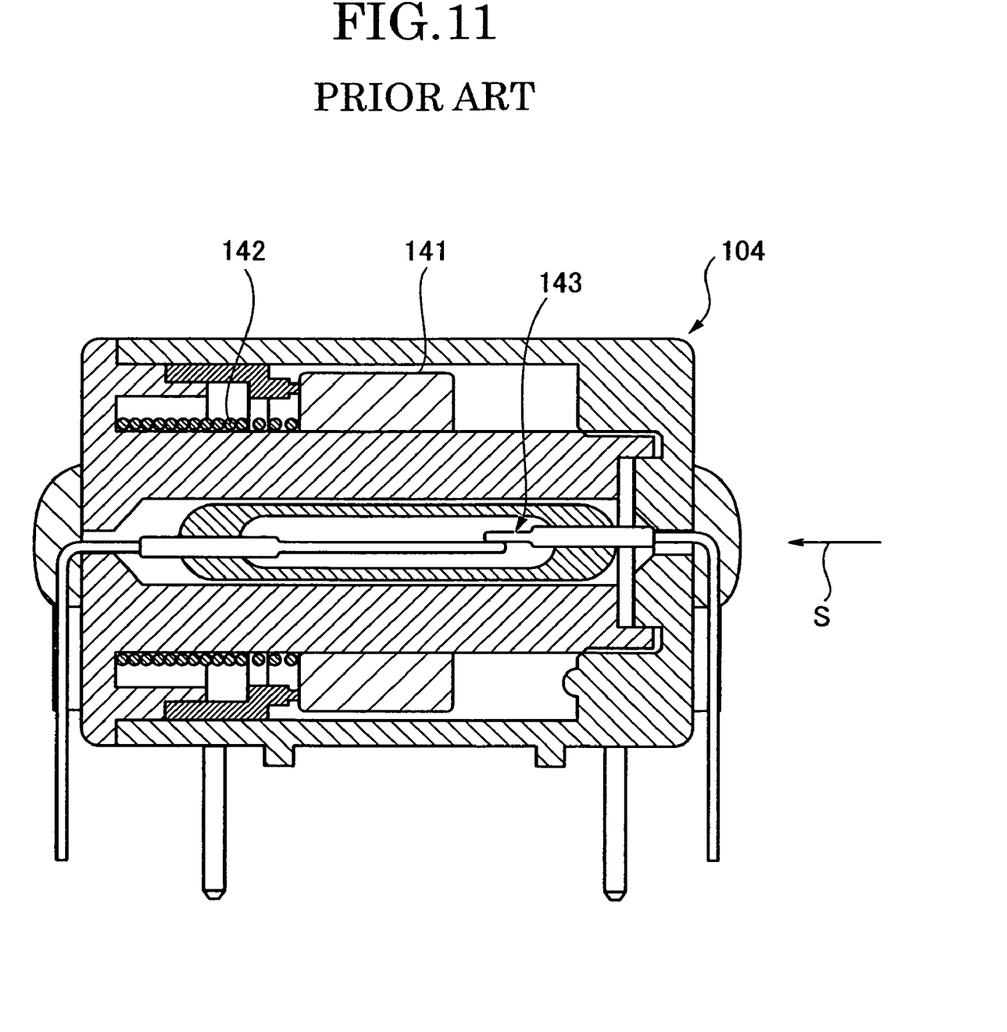
FIG. 11 is a cross sectional view of a prior art mechanical safing sensor.

Further, the airbag deployment controller 105 comprises a mechanical safing sensor block 153 which determines a turning-on/off state of the mechanical safing sensor 104. Specifically, as shown in FIG. 11, at an occurrence a of collision of a vehicle, an impact S applied to the mechanical safing sensor 104 causes a magnet 141 to move in an opposite direction to an impact direction, easing a spring force of a spring 142 to open a reed contact 143. From the open reed contact 143, the mechanical safing sensor block 153 determines that the mechanical safing sensor 104 is in an ON state, and inputs a result of the determination to an AND circuit block 155.

The AND circuit block 155 outputs a drive signal to the airbag unit 106 to deploy an airbag unit 106 when the mechanical safing sensor 104 is in the ON state as well as when the OR circuit block 154 determines to deploy the airbag. Then, the airbag unit 106 deploys the airbag.

That is, even when noises are inputted to the front acceleration sensor 102 and the central acceleration sensor 103, the AND circuit block 155 is prevented from outputting a drive signal to the airbag unit 106 since the reed contact 143 of the mechanical safing sensor 104 does not open. As described above, using the mechanical safing sensor 104, the passenger protection device 101 can prevent an erroneous operation of the airbag.

However, there still remains a problem in the mechanical safing sensor 104 that at an occurrence of collision, the mechanical safing sensor 104 is affected by a force from a direction different from the impact direction. Because of this, the reed contact 143 takes a lot of time to open. This causes a delay in determining to deploy the airbag, delaying deployment of the airbag. Without the mechanical safing sensor 104, erroneous operation of the airbag due to noises cannot be prevented with use of the electric sensors alone.

SUMMARY OF THE INVENTION

In view of solving the above problem, the present invention aims to provide an airbag deployment controller which can prevent an erroneous operation of an airbag using electric sensors alone and quickly deploy the airbag, as well as to provide a passenger protection device incorporating such an airbag deployment controller.

According to one aspect of the present invention, an airbag deployment controller is configured to use a plurality of electric collision sensors including a main sensor and a sub sensor to drive an airbag unit and to include a deployment determining unit for determining whether or not to drive the airbag unit according to a detected value of the main sensor; a collision determining unit for determining whether or not a detected value of the sub sensor exceeds a predetermined threshold which is set to be larger than an erroneous detected value due to a noise; and a deployment permitting unit for outputting a drive signal to the airbag unit when the deployment determining unit determines to drive the airbag unit and when the collision determining unit determines that the detected value of the sub sensor exceeds the predetermined threshold.

In features of this aspect, the airbag deployment controller is configured to use electric collision sensors including a first sensor and a second sensor to drive the airbag unit. In the airbag deployment controller, the deployment determining unit comprises a first deployment determining unit which sets the first sensor to be the main sensor and determines whether or not to drive the airbag unit according to a detected value of the first sensor, and a second deployment determining unit which sets the second sensor to be the main sensor and determines whether or not to drive the airbag unit according to a detected value of the second sensor. Further, the collision determining unit comprises a first collision determining unit which sets the first sensor to be the sub sensor and determines whether or not a detected value of the first sensor exceeds the predetermined threshold, and a second collision determining unit which sets the second sensor to be the sub sensor and determines whether or not a detected value of the second sensor exceeds the predetermined threshold. The deployment permitting unit comprises a first deployment permitting unit which outputs a drive signal to the airbag unit when the first deployment determining unit determines to drive the airbag unit and when the second collision determining unit determines that the detected value of the second sensor exceeds the predetermined threshold; a second deployment permitting unit which outputs a drive signal to the airbag unit when the second deployment determining unit determines to drive the airbag unit and when the first collision determining unit determines that the detected value of the first sensor exceeds the predetermined threshold; and a final deployment permitting unit which outputs the drive signal to the airbag unit when one of the first and second deployment permitting units determines to output the drive signal to the airbag unit.

According to another aspect of the invention, a passenger protection device is configured to include a plurality of electric collision sensors including a main sensor and a sub sensor, the above-described airbag deployment controller using the plurality of electric collision sensors to control deployment of an airbag, and an airbag unit being driven by the airbag deployment controller.

DETAILED DESCRIPTION OF THE PREFERRED EMBODIMENTS

Hereinafter, embodiments of the present invention will be described in detail with reference to the accompanying drawings.

First Embodiment

Figure 1:
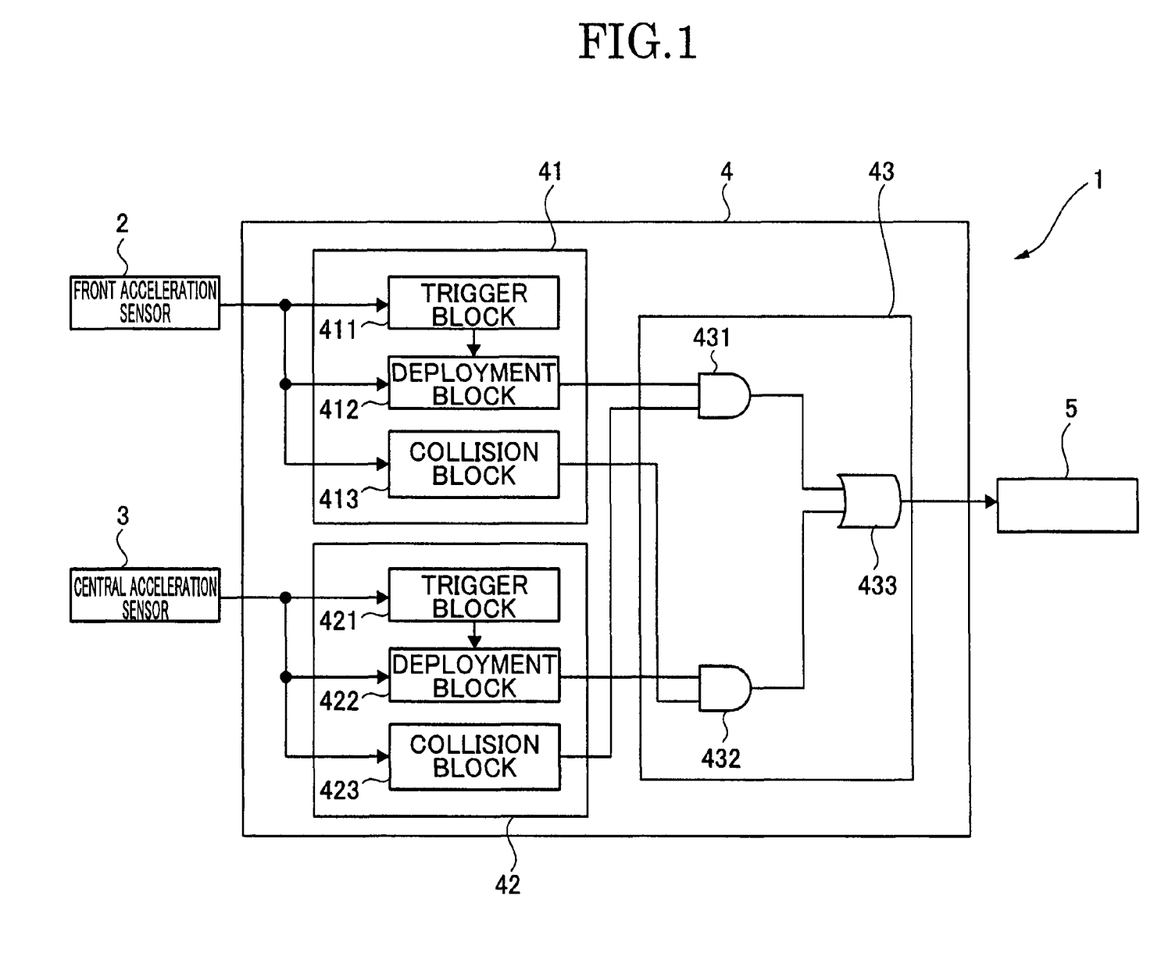
FIG. 1 is a block diagram of a passenger protection device according to a first embodiment of the present invention.

FIG. 1 shows a passenger protection device 1 according to the first embodiment of the present invention. The passenger protection device 1 for frontal collision comprises a front acceleration sensor 2, a central acceleration sensor 3, and an airbag deployment controller 4 and an airbag unit 5.

Figure 2:
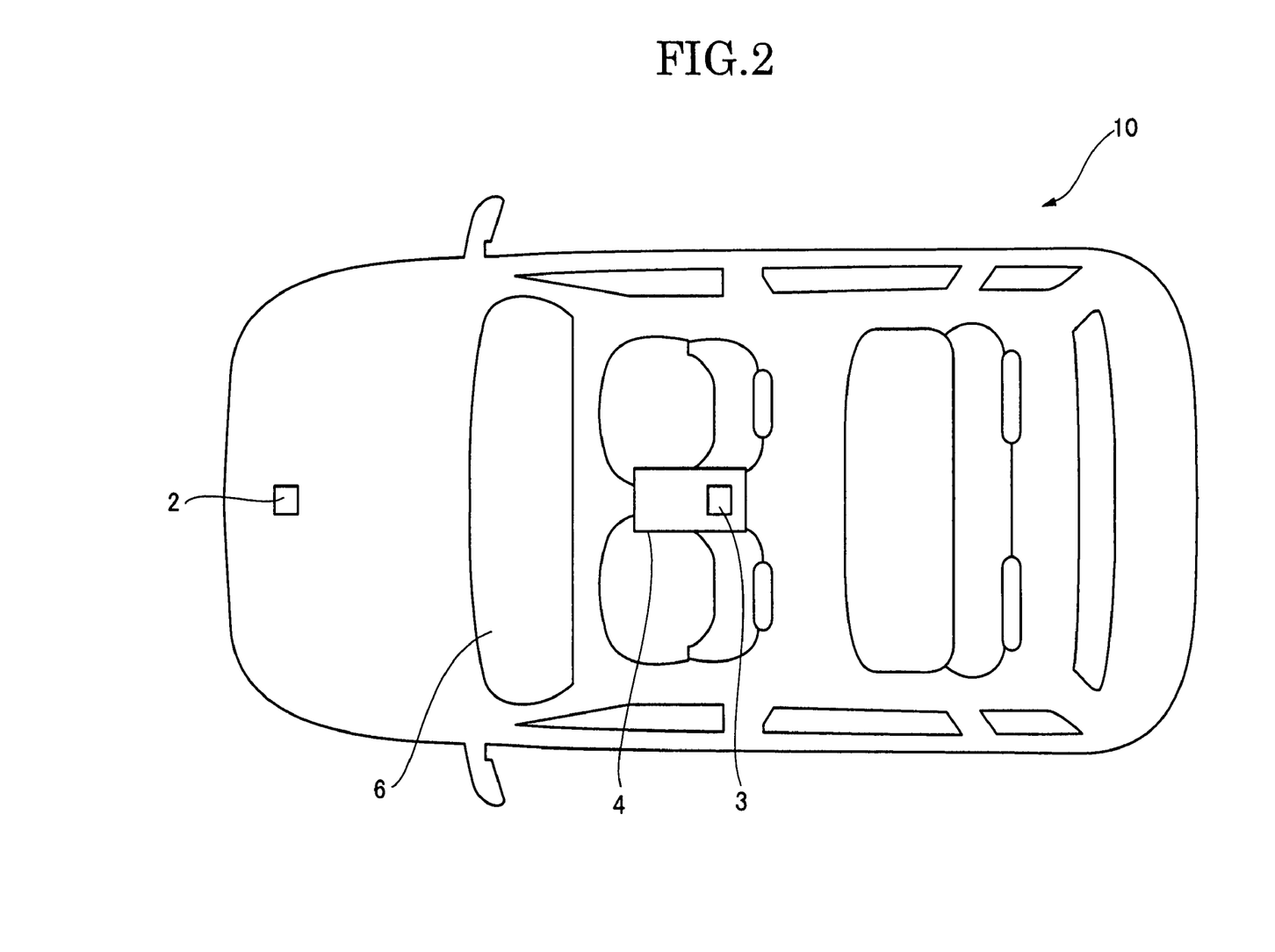
FIG. 2 is a plain view of a vehicle according to the first embodiment.

The front acceleration sensor 2 detects a frontal collision of a vehicle, and is mounted in almost the center of the front part (for example, near a radiator grill) of a vehicle 10, as shown in FIG. 2. The front acceleration sensor 2 is configured to detect an acceleration in a longitudinal direction of the vehicle for outputting a front acceleration value.

The central acceleration sensor 3 detects a frontal collision of a vehicle, and is mounted in almost the center of the longitudinal and right-left directions (for example, on the floor of a vehicle interior near a floor tunnel or a shift lever) of the vehicle 10, as shown in FIG. 2. The central acceleration sensor 3 is configured to detect an acceleration in the longitudinal direction of the vehicle for outputting a central acceleration value. The central acceleration sensor 3 need not be placed at almost the center of the longitudinal direction of the vehicle, but can be placed at a more posterior position than the front acceleration sensor 2.

The airbag deployment controller 4 drives the airbag unit 5 and is mounted in almost the center of the longitudinal and right-left directions of the vehicle 10. It contains the central acceleration sensor 3, as shown in FIG. 2.

Further, the airbag deployment controller 4 comprises a frontal deployment control unit 41, a central deployment control unit 42, and a deployment permission control unit 43, as shown in FIG. 1.

The frontal deployment control unit 41 comprises a frontal trigger block 411, a frontal deployment block 412, and a frontal collision block 413. The frontal trigger block 411 and the frontal deployment block 412 constitute a first deployment determining unit while the frontal collision block 413 constitutes a first collision determining unit.

An input of the frontal trigger block 411 is connected with an output of the front acceleration sensor 2. A first collision threshold is preset in the frontal trigger block 411 and specifically, it is from 10 to 20 G.

An input of the frontal deployment block 412 is connected with an output of the frontal trigger block 411 and an output of the front acceleration sensor 2.

An input of the frontal collision block 413 is connected with an output of the front acceleration sensor 2. A second collision threshold is preset in the frontal collision block 413, and it is set to be larger than the first collision threshold and larger than a value of the front acceleration sensor erroneously detected due to a noise. Specifically, the second collision threshold is from 20 to 30 G.

The central deployment control unit 42 comprises a central trigger block 421, and a central deployment block 422, and a central collision block 423.

The central trigger block 421 and central deployment block 422 constitute a second deployment determining unit while the central collision block 423 constitutes a second collision determining unit.

An input of the central trigger block 421 is connected with an output of the central acceleration sensor 3. A third collision threshold is preset in the central trigger block 421, and specifically, it is from 2 to 6 G.

An input of the central deployment block 422 is connected with an output of the central acceleration sensor 3 and an output of the central trigger block 421.

An input of the central collision block 423 is connected with an output of the central acceleration sensor 3. A fourth collision threshold is preset in the central collision block 423, and it is set to be larger than the third collision threshold and larger than a value of the central acceleration sensor 3 erroneously detected due to a noise. Specifically, the fourth collision threshold is from 3 to 5 G.

Further, the deployment permission control unit 43 comprises a first AND circuit block 431, a second AND circuit block 432, and an OR circuit block 433. The first AND circuit block 431 constitutes a first deployment permitting unit, the second AND circuit block 432 constitutes a second deployment permitting unit, and the OR circuit block 433 constitutes a final deployment permitting unit.

An input of the first AND circuit block 431 is connected with an output of the frontal deployment block 412 and an output of the central collision block 423. An input of the second AND circuit block 432 is connected with an output of the frontal collision block 413 and an output of the central deployment block 422. An input of the OR circuit block 433 is connected with an output of the first AND circuit block 431 and an output of the second AND circuit block 432.

The airbag unit 5 comprises an inflator, an igniter circuit (not shown), and a front airbag (FIG. 2) to deploy the airbag 6 in accordance with a drive signal inputted from the airbag deployment controller 4.

Figure 3:
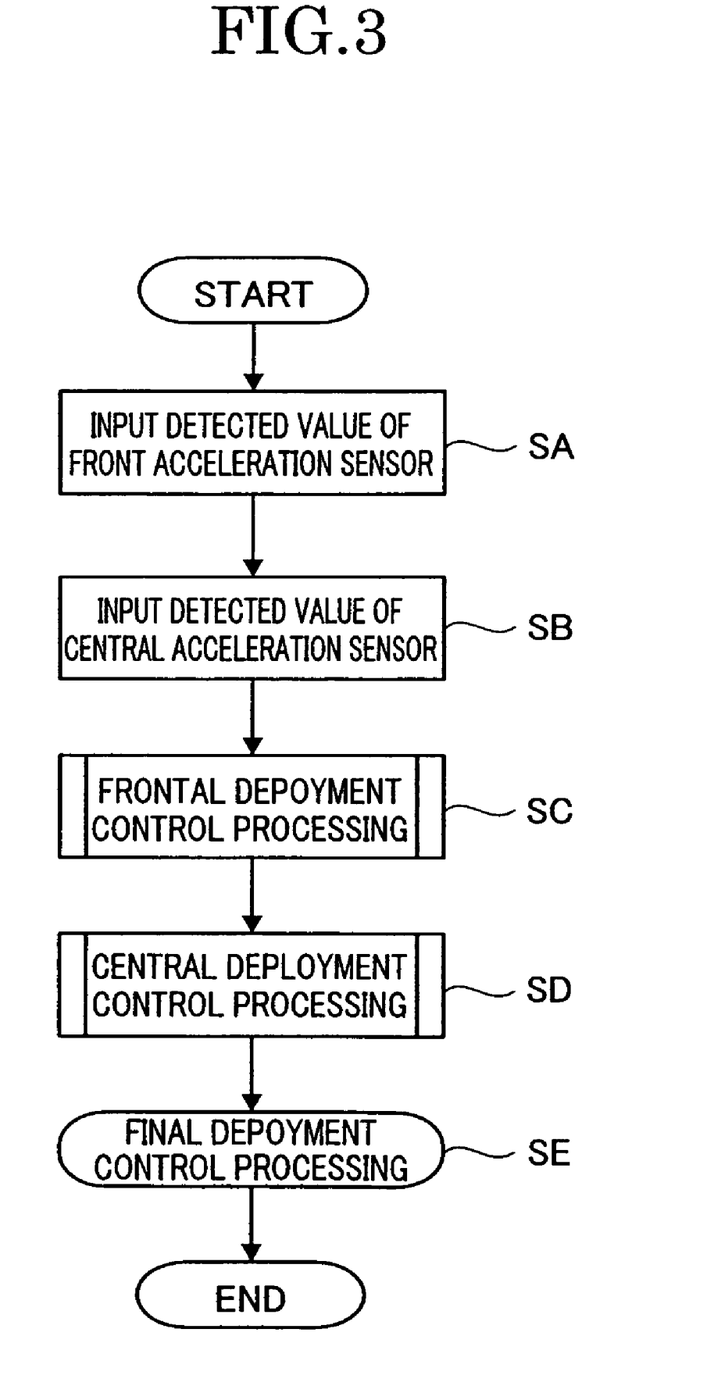
FIG. 3 is a flowchart of an airbag deployment control process according to the first embodiment.

Next, an operation of the passenger protection device 1 in the case of a frontal collision will be described with reference to a flowchart of FIG. 3. In the airbag deployment controller 4, a detected value of the front acceleration sensor 2 is inputted to the frontal trigger block 411 and the frontal collision block 413 in step SA. Then, a detected value of the central acceleration sensor 3 is inputted to the central trigger block 421 and the central collision block 423 in step SB. The order of steps SA and SB can be reversed.

Next, the airbag deployment controller 4 performs frontal and central deployment control processings in step SC and step SD, and a final deployment control processing in step SE in order. The order of steps SC and SD can be reversed. Each deployment control processing step will be described.

Figure 4:
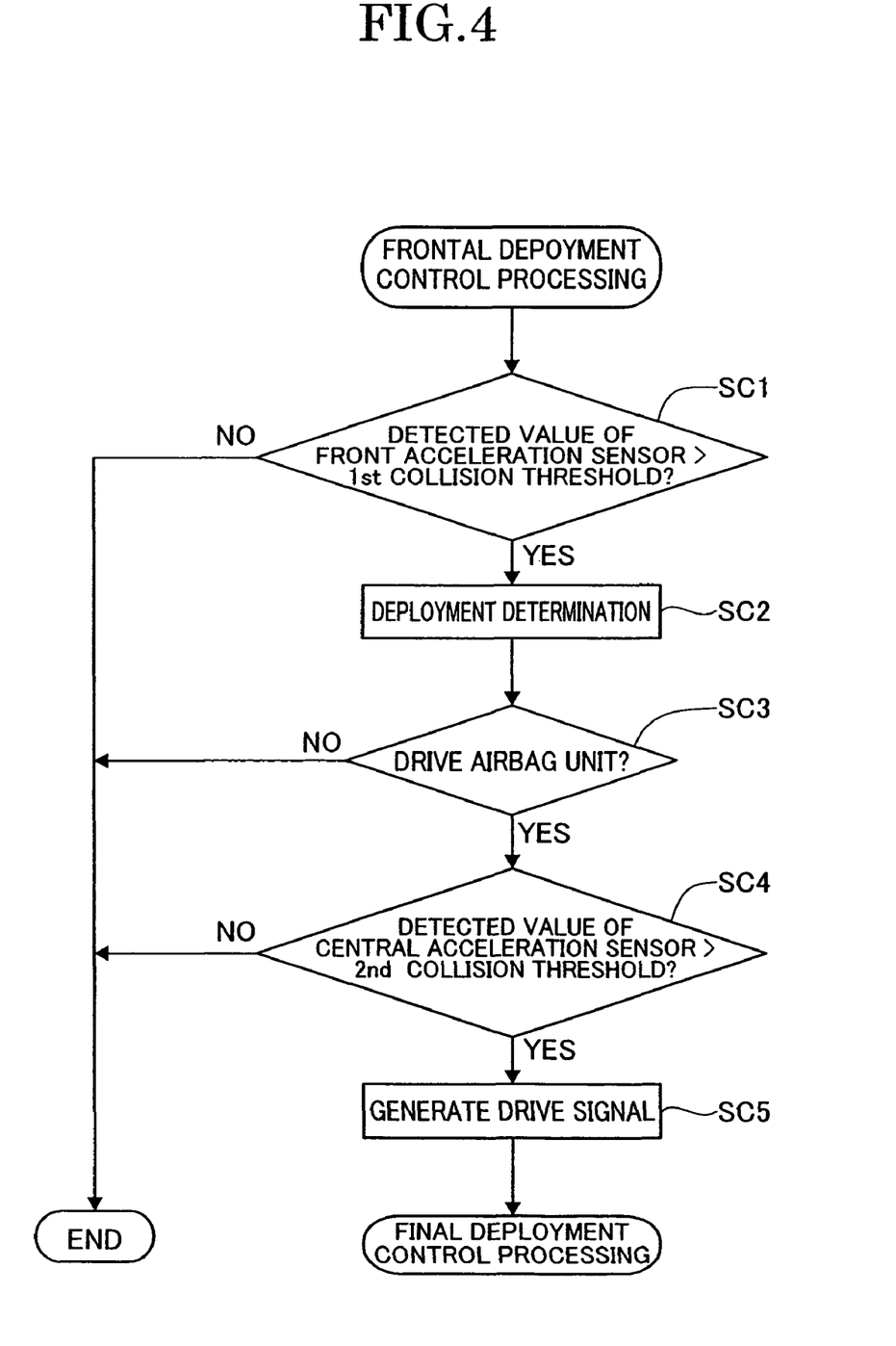
FIG. 4 is a flowchart of a frontal deployment control process of FIG. 3.

The frontal deployment control processing step is described with reference to FIGS. 1 and 4. FIG. 4 shows a flow thereof. First, the frontal trigger block 411 determines whether or not a detected value of the front acceleration sensor 2 exceeds the first collision threshold in step SC1. Upon determining that the detected value exceeds the first collision threshold (Yes in SC1), it performs a deployment determination in step SC2.

For the deployment determination, the frontal trigger block 411 outputs an integral start signal to the frontal deployment block 412, upon determining that the detected value of the front acceleration sensor 2 exceeds the first collision threshold. Receiving the integral start signal, the frontal deployment block 412 calculates a time integral value of a frontal acceleration (frontal acceleration integral value) based on a detected frontal acceleration value. Then, the frontal deployment block 412 determines whether or not to drive the airbag unit 5 from the frontal acceleration integral value in step SC3.

When the frontal deployment block 412 determines to drive the airbag unit 5 (Yes in step SC3), the central collision block 423 determines whether or not a detected value of the central acceleration sensor 3 exceeds the second collision threshold for a collision determination in step SC4.

The central collision block 423 generates a drive signal for the airbag unit 5 according to the frontal acceleration integral value in step SC5, upon determining that the detected value of the central acceleration sensor 3 exceeds the second collision threshold. And, it proceeds to the final deployment control processing.

Figure 5:
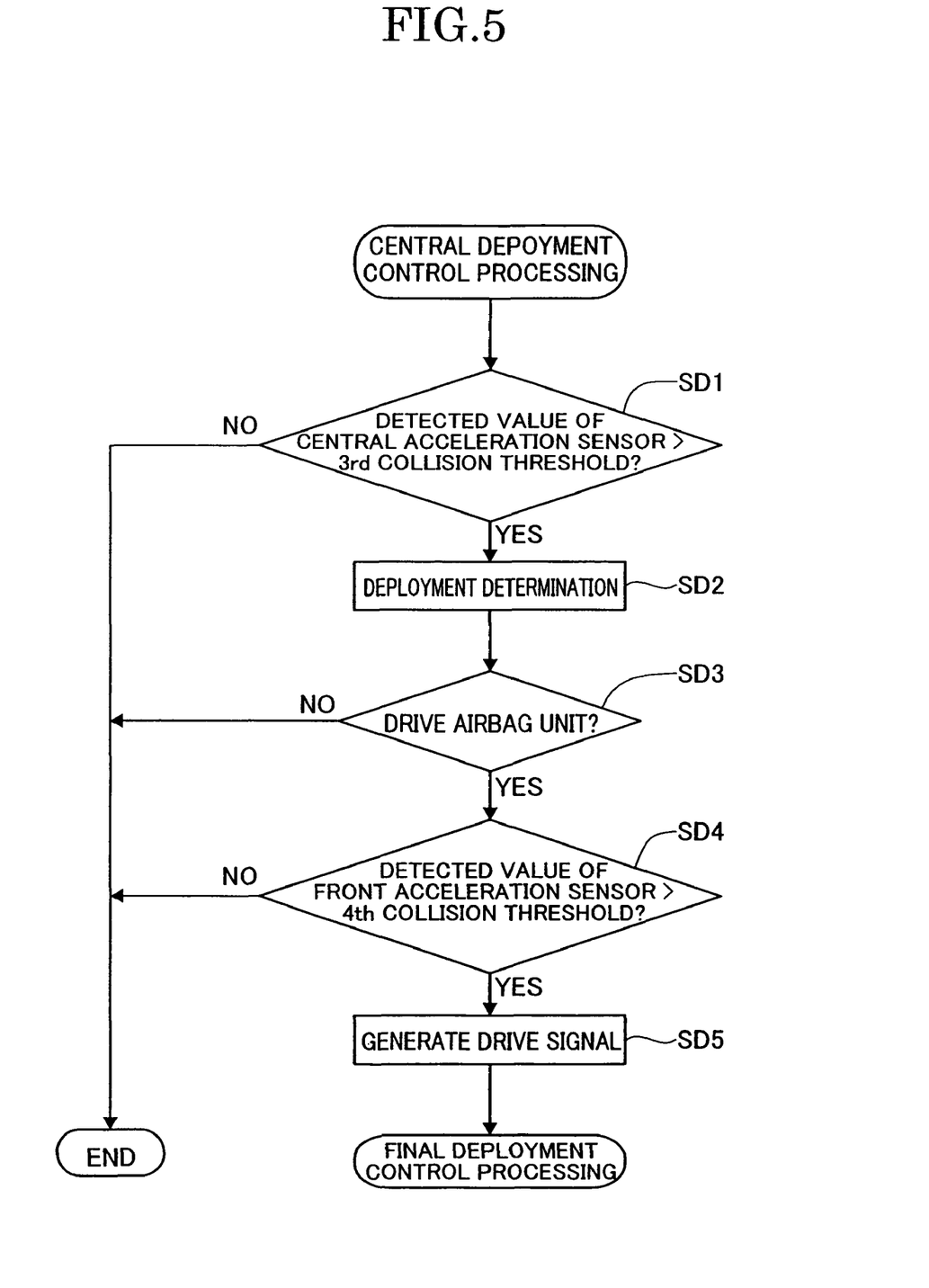
FIG. 5 is a flowchart of a central deployment control process of FIG. 3.

FIG. 5 shows a flow of the central deployment control processing. First, the central trigger block 421 determines whether or not a detected value of the central acceleration sensor 3 exceeds the third collision threshold in step SD1. Upon determining that the detected value exceeds the third collision threshold (Yes in SD1), it performs a deployment determination in step SD2.

For the deployment determination, the central trigger block 421 outputs an integral start signal to the central deployment block 422, upon determining that the detected value of the central acceleration sensor 3 exceeds the third collision threshold. Receiving the integral start signal, the central deployment block 422 calculates a time integral value of a central acceleration (central acceleration integral value) based on a detected central acceleration value. Then, the central deployment block 422 determines whether or not to drive the airbag unit 5 from the central acceleration integral value in step SD3.

When the central deployment block 422 determines to drive the airbag unit 5 (Yes in step SD3), the frontal collision block 413 determines whether or not the detected value of the front acceleration sensor 2 exceeds the fourth collision threshold for a collision determination in step SD4.

The frontal collision block 413 generates a drive signal for the airbag unit 5 according to the frontal acceleration integral value in step SD5, upon determining that the detected value of the frontal acceleration sensor 2 exceeds the fourth collision threshold. And, it proceeds to the final deployment control processing.

In the final deployment control processing, the drive signal generated in step SC5 or SD5 is outputted to the airbag unit 5. Upon receipt of the drive signal, the airbag unit 5 operates an inflator to deploy the airbag 6.

As described above, the passenger protection device 1 (airbag deployment controller 4) according to the first embodiment adopts electric sensors for both of the main and sub sensors which are unsusceptible to noises not caused by a crash or a collision, so that it can speedily perform a collision detection and a deployment determination to quickly output a drive signal to the airbag unit 5. Accordingly, the passenger protection device 1 is able to quickly deploy the airbag 6.

In the passenger protection device 1, when the main sensor (front acceleration sensor 2 or central acceleration sensor 3) receives a noise, an erroneous detected value is inputted to either of the two trigger blocks 411, 421 of the airbag deployment controller 4 and a drive signal is generated for the airbag unit 5. However, the airbag deployment controller 4 can be prevented from erroneously (falsely) determining to deploy the airbag since it makes a final determination based on a detected value of the sub sensor (central acceleration sensor 3 or front acceleration sensor 2). Accordingly, the passenger protection device 1 according to the first embodiment can prevent an erroneous operation of the airbag 6 due to noises with use of the electric sensors only.

Moreover, the passenger protection device 1 uses both the front acceleration sensor 2 and the central acceleration sensor 3 for the main and sub sensors. Because of this, the passenger protection device 1 can perform more precise control processing, compared with using one of the front and center acceleration sensors 2, 3 for the main sensor, and can determine the airbag deployment more precisely. Accordingly, the passenger protection device 1 can control deployment of the airbag 6 more precisely.

Second Embodiment

Figure 6:
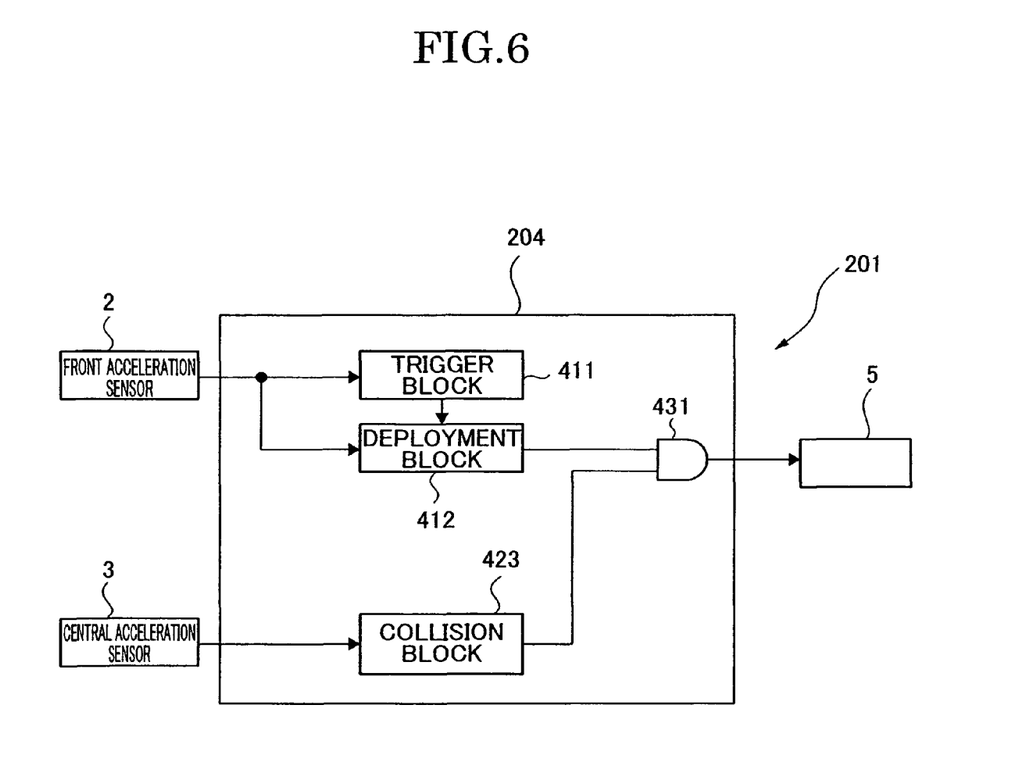
FIG. 6 is a block diagram of a passenger protection device according to a second embodiment of the present invention.

FIG. 6 shows a passenger protection device 201 according to the second embodiment of the present invention. In the present embodiment, the same components as those in the first embodiment are given the same numeric codes, and only a different portion therefrom will be described. The passenger protection device 201 is intended for frontal collision, and comprises a front acceleration sensor 2, a central acceleration sensor 3, an airbag deployment controller 204, and an airbag unit 5.

In the passenger protection device 201, the front acceleration sensor 2 constitutes a main sensor and the central acceleration sensor 3 constitutes a sub sensor.

The airbag deployment controller 204 comprises a frontal trigger block 411, a front deployment block 412, a central collision block 423, and a first AND circuit block 431.

The frontal trigger block 411 and the frontal deployment block 412 constitute a deployment determining unit, the central collision block 423 constitutes a collision determining unit, and the first AND circuit block 431 constitutes a deployment permitting unit.

Figure 7:
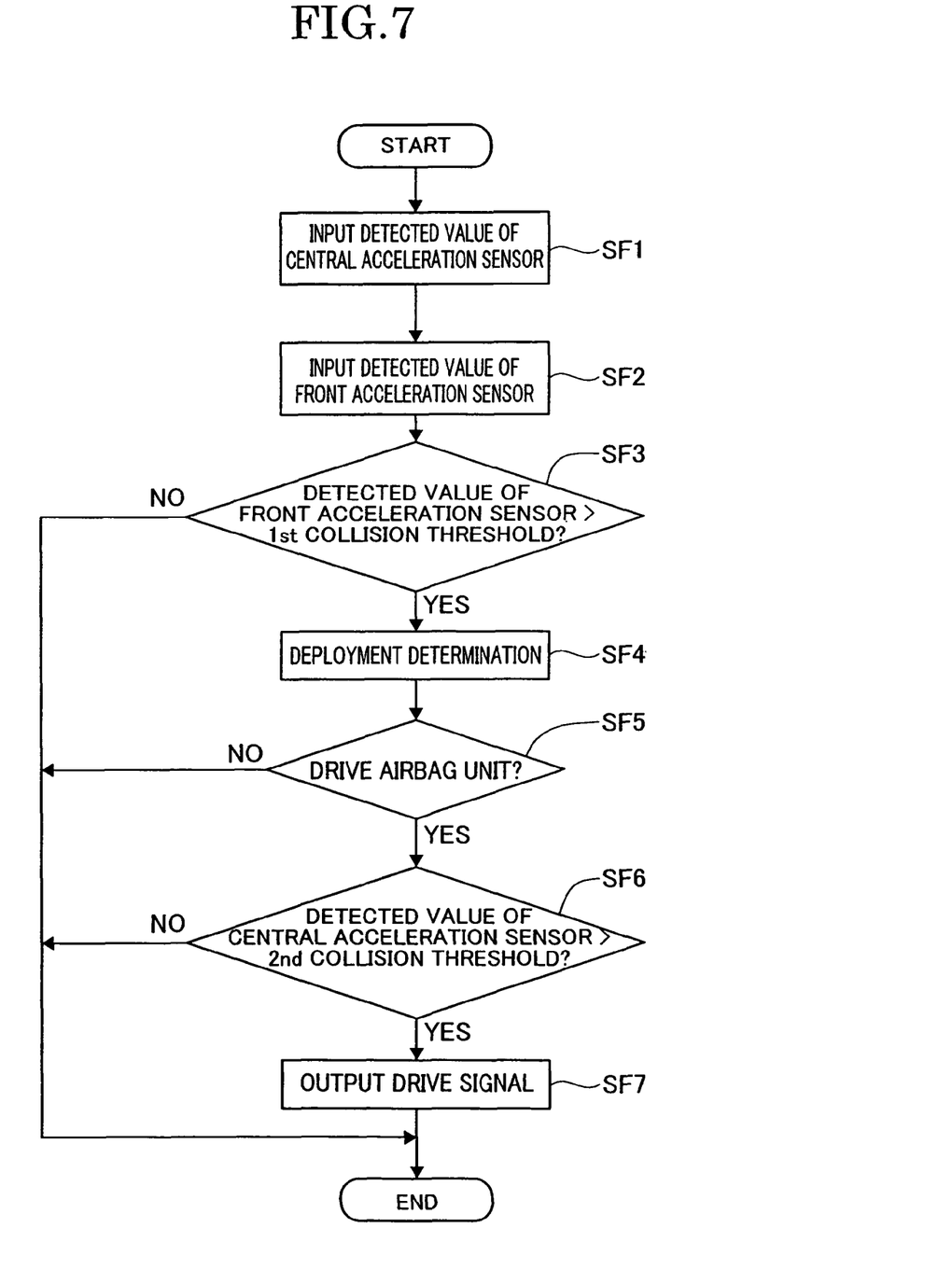
FIG. 7 is a flowchart of an airbag deployment control process according to the second embodiment.

Next, an operation of thus-configured passenger protection device 201 in the case of a frontal collision is described. FIG. 7 shows a flow of a deployment control processing to the airbag 6 by the airbag deployment controller 204. First, a detected value of the central acceleration sensor 3 is inputted to the central collision block 423 in step SF1, and a detected value of the front acceleration sensor 2 is inputted to the front trigger block 411 in step SF2. The order of steps SF1, SF2 can be reversed.

The frontal trigger block 411 determines whether or not the detected value of the front acceleration sensor 2 exceeds the first collision threshold in step SF3. Upon determining that the detected value exceeds the first collision threshold (Yes in SF3), it performs a deployment determination in step SF4.

For the deployment determination, the frontal trigger block 411 outputs an integral start signal to the frontal deployment block 412, upon determining that the detected value of the front acceleration sensor 2 exceeds the first collision threshold. Receiving the integral start signal, the frontal deployment block 412 calculates an integral value of a frontal acceleration based on a detected frontal acceleration value. Then, the frontal deployment block 412 determines whether or not to drive the airbag unit 5 from the frontal acceleration integral value in step SF5.

When the frontal deployment block 412 determines to drive the airbag unit 5 (Yes in step SF5), the central collision block 423 determines whether or not the detected value of the central acceleration sensor 3 exceeds the second collision threshold for a collision determination in step SF6.

With the detected value being over the second collision threshold, the central collision block 423 generates a drive signal according to the frontal acceleration integral value and outputs it to the airbag unit 5. Upon receiving the drive signal, the airbag unit 5 operates the inflator to deploy the airbag 6.

As described above, the passenger protection device 201 (airbag deployment controller 204) according to the second embodiment adopts electric sensors for both of the main and sub sensors, so that it can quickly output a drive signal to the airbag unit 5 as the passenger protection device 1 in the first embodiment does. Accordingly, the passenger protection device 201 is able to quickly deploy the airbag 6.

Further, even when the main sensor (front acceleration sensor 2) receives a noise, causing generation of a drive signal for the airbag unit 5, the airbag deployment controller 204 can be prevented from erroneously (falsely) determining the airbag deployment since it makes a final determination based on a detected value of the sub sensor (central acceleration sensor 3). Accordingly, the passenger protection device 201 according to the second embodiment can prevent an erroneous operation of the airbag 6 due to noises with use of the electric sensors only.

Moreover, the passenger protection device 201 uses the front acceleration sensor 2 for the main sensor and the central acceleration sensor 3 for the sub sensor. This makes it possible to simplify the structure of the airbag deployment controller 204 compared to that in the first embodiment.

Third Embodiment

Figure 8:
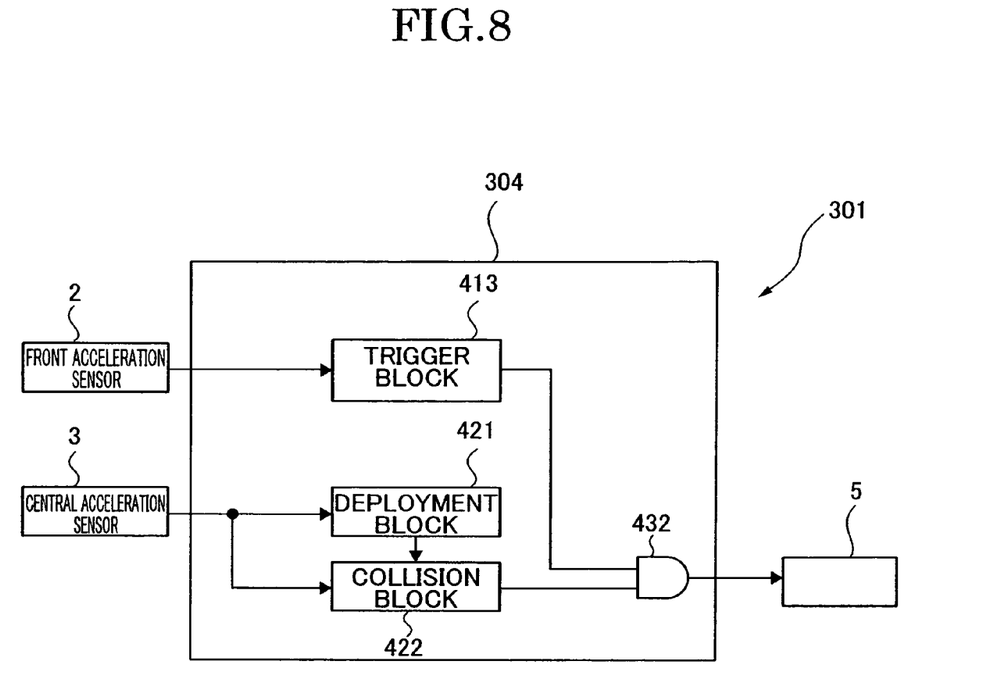
FIG. 8 is a block diagram of a passenger protection device according to a third embodiment of the present invention.

FIG. 8 shows a passenger protection device 301 according to the third embodiment of the present invention. In the present embodiment, the same components as those in the first embodiment are given the same numeric codes, and only a different portion therefrom will be described. The passenger protection device 301 is intended for frontal collision, and comprises a front acceleration sensor 2, a central acceleration sensor 3, an airbag deployment controller 304, and an airbag unit 5.

In the passenger protection device 301, the central acceleration sensor 3 constitutes a main sensor and the front acceleration sensor 2 constitutes a sub sensor.

The airbag deployment controller 304 comprises a frontal trigger block 413, a central deployment block 421, a central collision block 422, and a second AND circuit block 432.

The central deployment block 421 and the central collision block 422 constitute a deployment determining unit, the frontal trigger block 413 constitutes a collision determining unit, and the second AND circuit block 432 constitutes a deployment permitting unit.

Figure 9:
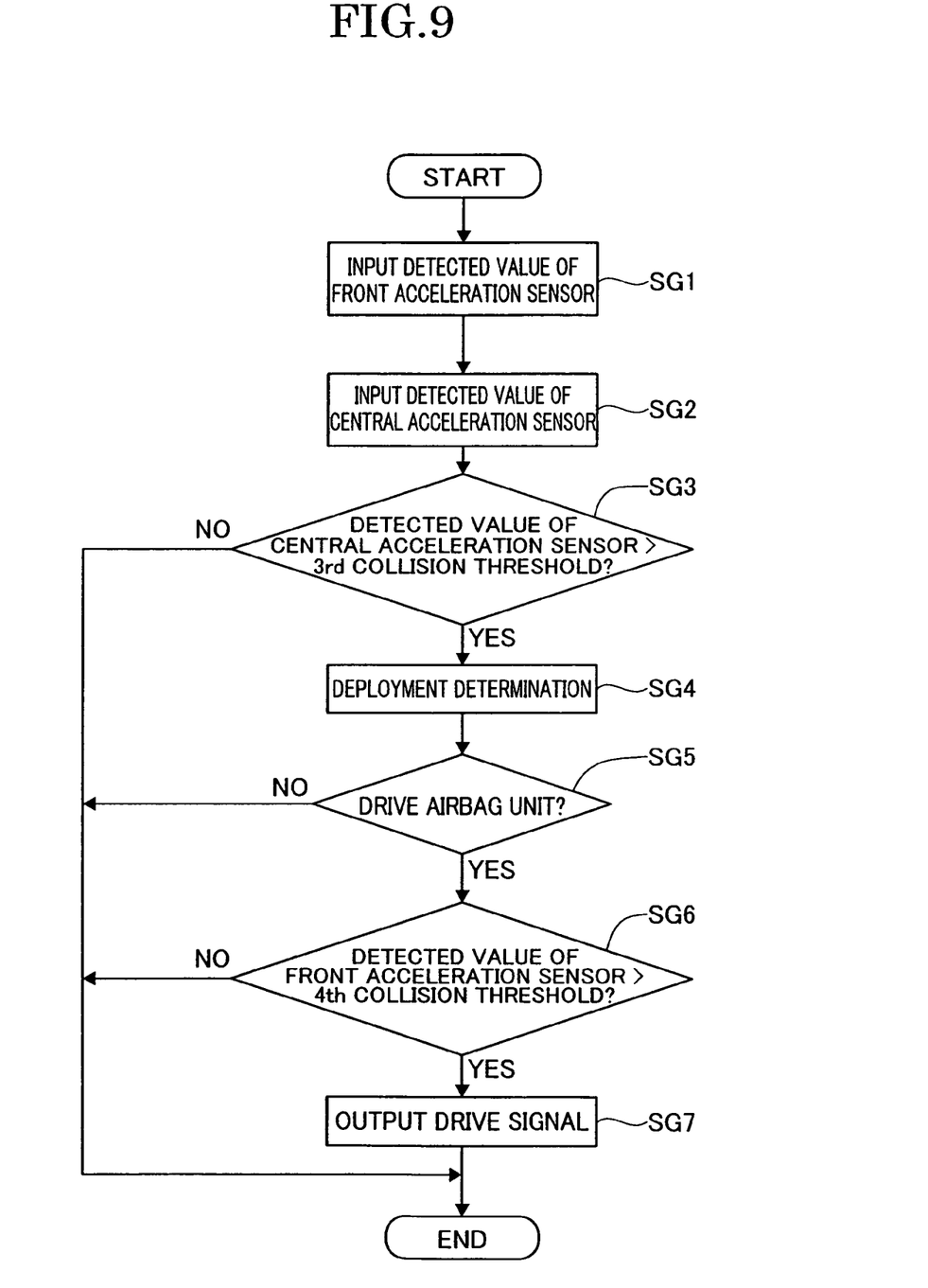
FIG. 9 is a flowchart of an airbag deployment control process according to the third embodiment.

Next, an operation of thus-configured passenger protection device 301 in the case of a frontal collision is described. FIG. 9 shows a flow of a deployment control processing to the airbag 6 by the airbag deployment controller 304. First, a detected value of the front acceleration sensor 2 is inputted to the frontal trigger block 413 in step SG1, and a detected value of the central acceleration sensor 3 is inputted to the central deployment block 421 in step SG2. The order of steps SG1, SG2 can be reversed.

Then, the central deployment block 421 determines whether or not the detected value of the central acceleration sensor 3 exceeds the third collision threshold in step SG3. Upon determining that the detected value exceeds the third collision threshold (Yes in SG3), it performs a deployment determination in step SG4.

For the deployment determination, the central deployment block 421 outputs an integral start signal to the central collision block 422, upon determining that the detected value of the central acceleration sensor 3 exceeds the third collision threshold. Receiving the integral start signal, the central collision block 422 calculates an integral value of a central acceleration based on a detected central acceleration. Then, the central collision block 422 determines whether or not to drive the airbag unit 5 from the central acceleration integral value in step SG5.

When the central collision block 422 determines to drive the airbag unit 5 (Yes in step SG5), the frontal trigger block 413 determines whether or not the detected value of the front acceleration sensor 2 exceeds the fourth collision threshold for a collision determination in step SG6.

With the detected value being over the fourth collision threshold, the frontal trigger block 413 generates a drive signal according to the frontal acceleration integral value and outputs it to the airbag unit 5. Upon receiving the drive signal, the airbag unit 5 operates the inflator to deploy the airbag 6.

As described above, the passenger protection device 301 (airbag deployment controller 304) according to the third embodiment adopts electric sensors for both of the main and sub sensors, so that it can quickly output a drive signal to the airbag unit 5 as those in the first and second embodiments do. Accordingly, the passenger protection device 301 is able to quickly deploy the airbag 6.

Even when the main sensor (central acceleration sensor 3) receives a noise, causing generation of a drive signal for the airbag unit 5, the airbag deployment controller 304 can be prevented from erroneously (falsely) determining the airbag deployment since it makes a final determination based on a detected value of the sub sensor (front acceleration sensor 2). Accordingly, the passenger protection device 301 according to the third embodiment can prevent an erroneous operation of the airbag 6 due to noises with use of the electric sensors only.

Moreover, the passenger protection device 301 uses the central acceleration sensor 3 for the main sensor and the front acceleration sensor 2 for the sub sensor. This makes it possible to simplify the structure of the airbag deployment controller 304 compared to that in the first embodiment.

As described above, the passenger protection device and the airbag deployment controller according to the present invention achieves prevention of an erroneous operation of the airbag due to noises and quick airbag deployment.

Although the present invention has been described in terms of exemplary embodiments, it is not limited thereto. It should be appreciated that variations may be made in the embodiments described by persons skilled in the art without departing from the scope of the present invention as defined by the following claims. For example, the above embodiments have described an acceleration sensor as an electric collision sensor, however, other kinds of electric sensors are usable.

What is claimed is:

1. A passenger protection device comprising:
an airbag unit for deploying a single airbag;
a first electronic collision sensor;
a second electronic collision sensor; and
an airbag deployment controller driven by said first sensor and said second sensor and configured to drive said airbag unit, said airbag deployment controller including:
a first deployment determining unit for setting said first sensor to be a main sensor, for determining whether or not a detected value received from said first sensor exceeds a first collision threshold value which is equal to or smaller than an erroneous detected value due to a noise of said first sensor, and for deciding whether or not to drive said airbag unit according to a result of the determination by said first deployment determining unit;
a second collision determining unit for setting said second sensor to be a sub sensor,
and for determining whether or not a detected value received from said second sensor exceeds a second collision threshold value which is larger than the first collision threshold value;
a first deployment permitting unit for outputting a drive signal to said airbag unit when said first deployment determining unit decides to drive said airbag unit and when said second collision determining unit determines that the detected value received from said second sensor exceeds the second collision threshold value;
a second deployment determining unit for setting said second sensor to be a main sensor, for determining whether or not a detected value of said second sensor exceeds a third collision threshold value which is equal to or smaller than an erroneous detected value due to a noise of said second sensor, and for deciding whether or not to drive said airbag unit according to a result of the determination by said second deployment determining unit;
a first collision determining unit for setting said first sensor to be a sub sensor, and for determining whether or not a detected value received from said first sensor exceeds a fourth collision threshold value which is larger than the third collision threshold value;
a second deployment permitting unit for outputting a drive signal to said airbag unit when said second deployment determining unit decides to drive said airbag unit and when said first collision determining unit determines that the detected value received from said first sensor exceeds the fourth collision threshold value; and
a final deployment permitting unit for outputting a drive signal to said airbag unit when at least one of said first deployment permitting unit and said second deployment permitting unit outputs the drive signal to said airbag unit.

2. The passenger protection device of claim 1, wherein said first deployment determining unit, said second deployment determining unit, said first collision determining unit, and said second collision determining unit are configured to determine whether or not the detected values of the corresponding first sensor and second sensor exceed the respective collision threshold values by using the detected values without a change.

* * * * *